June 16, 1953  M. BRODHEIM  2,641,817
ADJUSTABLE HOSE CLAMP
Filed Nov. 9, 1951

INVENTOR
MORRIS BRODHEIM,
BY
McMorrow, Berman + Davidson
ATTORNEYS

Patented June 16, 1953

2,641,817

UNITED STATES PATENT OFFICE 2,641,817

ADJUSTABLE HOSE CLAMP

Morris Brodheim, Philadelphia, Pa.

Application November 9, 1951, Serial No. 255,572

2 Claims. (Cl. 24—269)

This invention relates to adjustable hose clamps, and more particularly to a hose clamp including a flexible band and means for winding the band tightly around a hose.

It is among the objects of the invention to provide an improved adjustable hose clamp which can be easily placed around a hose and adjusted to tightly bind the hose around a fitting or coupling sleeve; which is easily adjustable to any desired tension and will positively hold in any desired adjustment; and which is simple and durable in construction, economical to manufacture, easy to apply, and positive and effective in operation.

Other objects and advantages will become apparent from a consideration of the following description and the appended claims in conjunction with the accompanying drawing, wherein:

Figure 1:
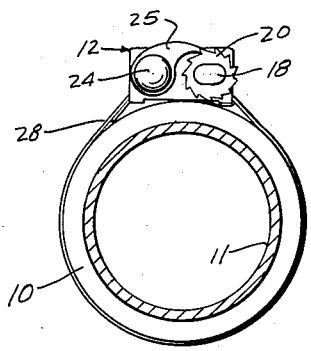
Figure 1 is an end elevational view of a hose and a tubular fitting received in the hose with a hose clamp illustrative of the invention mounted on the hose and encircling the hose and the fitting.
Figure 2:
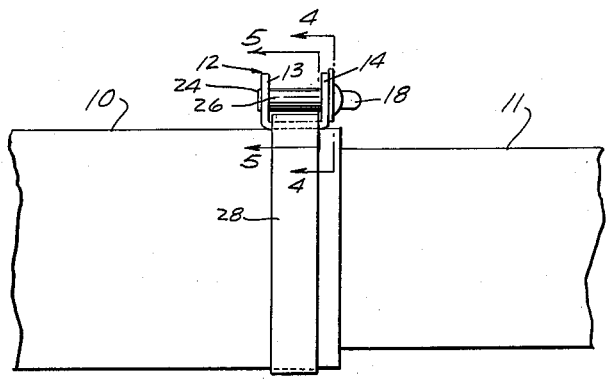
Figure 2 is a side elevational view of the hose, fitting and hose clamp illustrated in Figure 1.
Figure 3:
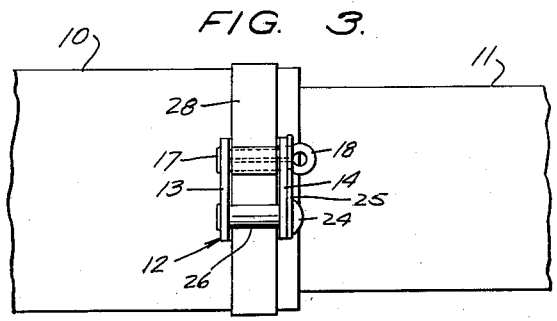
Figure 3 is a top plan view of the hose, fitting and hose clamp as illustrated in Figures 1 and 2.
Figure 4:
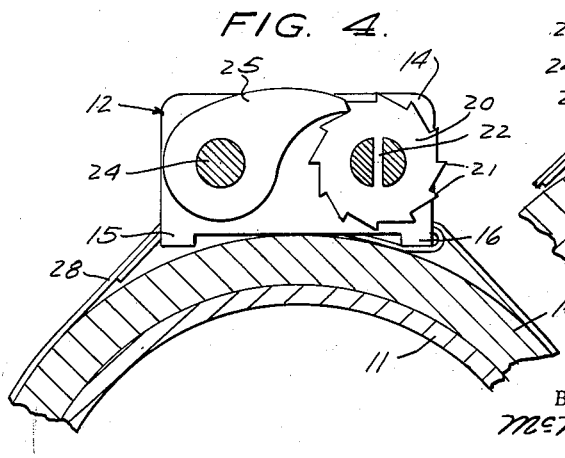
Figure 4 is a cross-sectional view on an enlarged scale on the line 4—4 of Figure 2.
Figure 5:
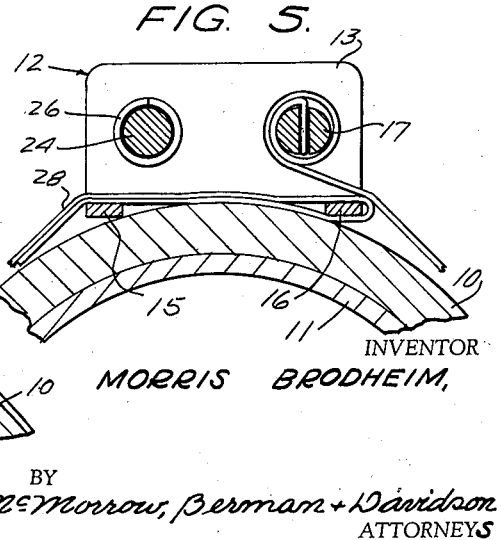
Figure 5 is a cross-sectional view on an enlarged scale on the line 5—5 of Figure 2.

With continued reference to the drawing, the numeral 10 designates a flexible hose of known construction, formed of rubber or other suitable flexible material, and the numeral 11 designates a tubular member, such as a terminal or coupling sleeve having one end telescopically received in one end of the hose.

The hose clamp, generally designated at 12, includes a frame preferably formed of sheet metal by a suitable stamping operation and having spaced apart and substantially parallel side walls 13 and 14 of rectangular shape and transverse bars 15 and 16 extending transversely of the frame, one at each end of one side thereof and joined at their respectively opposite ends to the side walls 13 and 14 at corresponding corners of the latter. Each of the side walls 13 and 14 is provided with two spaced apart apertures, and a split winding element 17 extends transversely of the frame and is journaled near its respectively opposite ends in corresponding apertures in the side walls 13 and 14. This winding element is disposed adjacent and substantially parallel to the transverse bar 16 of the frame, and is longitudinally split, being in the form of a shortened cotter key having two coextensive legs of substantially semicircular cross-sectional shape and a substantially circular loop or eye formation 18 at one end thereof.

A ratchet wheel 20 having peripheral teeth 21 is mounted on the winding element 17 adjacent the outer side of the side wall 14 of the frame. This ratchet wheel has apertures of semicircular shape extending therethrough one at each side of the center thereof for receiving the legs of the winding element, and has a bridge 22 extending diametrically thereof between the two apertures of semicircular shape, which bridge is disposed between the legs of the winding element adjacent the loop 18 and secures the ratchet wheel against rotation relative to the winding element.

A rivet 24 extends through the other two apertures in the side walls 13 and 14 of the frame and is disposed adjacent and substantially parallel to the transverse bar 15 of the frame.

A pawl 25 is pivotally mounted on the rivet 24 adjacent the other side of the side wall 14 of the frame and engages the teeth 21 of the ratchet wheel or element 22 to lock the ratchet wheel in selected positions of rotational adjustment.

A spacer sleeve 26 surrounds the rivet 24 between the side walls 13 and 14 of the frame and maintains these side walls substantially parallel and spaced apart a predetermined distance.

A flexible band 28 is looped near one end around the transverse bar 16 of the frame adjacent the winding element 17 and is carried over the transverse bar 15. This band has its other end disposed between the legs of the longitudinally split winding element 17 and has a length to encircle the hose 10 on which the hose clamp is mounted.

In applying the hose clamp, the frame with the band 28 looped around the transverse bar 16 and carried over the transverse bar 15 is placed on the hose at the desired location. The band is then brought around the hose and its other end inserted between the legs of the split winding element 17, and a suitable tool is then inserted in the eye 18 of the winding element, and the winding element rotated to tighten the flexible band around the hose, the pawl 25 being held in engagement with the teeth of the ratchet element 20 by finger pressure, so that the winding element will always be held against reverse rotation. When the band has been sufficiently tightened, the tool is removed from the eye 18 and the band will be held at the desired tension by engagement of the pawl 25 with the ratchet wheel 20.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hose clamp comprising a frame including spaced apart and substantially parallel side walls and spaced apart bars extending transversely of said frame one at each end of one side thereof and joined at their respectively opposite ends to said side walls at the respectively opposite ends of the latter, a longitudinally split winding element extending transversely of said frame near one end of the latter and journaled in said side walls, a ratchet wheel mounted on said winding element at the outer side of one of said side walls, fastening means extending transversely of said frame and through said side walls at a location spaced from said winding element, a pawl mounted on said fastening means at the outer side of said one side wall and engaging said ratchet wheel to hold the latter in selected positions of rotational adjustment, and a flexible band secured at one end to the transverse bar adjacent said winding element and extending across the space between said bars and over the other of said transverse bars, said band being connected at its other end to said winding element and adapted to encircle a hose on which the clamp is mounted.

2. A hose clamp comprising a frame including spaced apart and substantially parallel side walls and spaced apart bars extending transversely of said frame one at each end of one side thereof and joined at their respectively opposite ends to said side walls at the respectively opposite ends of the latter, a longitudinally split winding element extending transversely of said frame near one end of the frame and journaled in said side walls, a ratchet wheel mounted on said winding element, a pawl pivotally mounted on said frame at a location spaced from said winding element and engaging said ratchet wheel to hold the latter in selected positions of rotational adjustment, and a flexible band secured at one end to the transverse bar nearer said winding element and extending across the space between said bars and over the other of said transverse bars, said band being connected at its other end to said winding element and adapted to encircle a hose on which the clamp is mounted.

MORRIS BRODHEIM.

References Cited in the file of this patent

UNITED STATES PATENTS

| Number | Name | Date |
|---|---|---|
| 493,432 | Kidd | May 14, 1893 |
| 624,977 | Reeves | May 16, 1899 |
| 708,196 | Bradbury | Sept. 2, 1902 |
| 1,596,193 | Kuhlman | Aug. 17, 1926 |
| 1,726,871 | Tute | Sept. 3, 1929 |
| 2,020,175 | Durr | Nov. 5, 1935 |
| 2,354,833 | Roberts | Aug. 1, 1944 |